United States Patent
Sanderovich (10) Patent No.: US 9,425,948 B2
(45) Date of Patent: Aug. 23, 2016

(54) TECHNIQUES FOR SYNCHRONIZING A CLOCK OF A WIRED CONNECTION WHEN TRANSMITTED OVER A WIRELESS CHANNEL

(71) Applicant: QUALCOMM INCORPORATED, San Diego, CA (US)

(72) Inventor: Amichai Sanderovich, Haifa (IL)

(73) Assignee: QUALCOMM INCORPORATED, San Diego, CA (US)

( * ) Notice: Subject to any disclaimer, the term of this patent is extended or adjusted under 35 U.S.C. 154(b) by 456 days.

(21) Appl. No.: 13/749,984

(22) Filed: Jan. 25, 2013

(65) Prior Publication Data

US 2013/0195233 A1 Aug. 1, 2013

Related U.S. Application Data

(60) Provisional application No. 61/591,032, filed on Jan. 26, 2012.

(51) Int. Cl.
| | |
|---|---|
| *G06F 1/04* | (2006.01) |
| *H04L 7/00* | (2006.01) |
| *G09G 5/00* | (2006.01) |
| *G06F 1/14* | (2006.01) |

(52) U.S. Cl.
CPC ............. *H04L 7/0012* (2013.01); *G09G 5/008* (2013.01); *G06F 1/14* (2013.01); *G09G 2370/10* (2013.01); *G09G 2370/12* (2013.01); *G09G 2370/16* (2013.01)

(58) Field of Classification Search
CPC .............................. H04L 7/0012; G09G 5/006
USPC .......................................................... 375/354
See application file for complete search history.

(56) References Cited

U.S. PATENT DOCUMENTS

| | | | | |
|---|---|---|---|---|
| 7,103,124 B1 * | 9/2006 | Lindskog et al. | ............. | 375/354 |
| 7,440,474 B1 * | 10/2008 | Goldman | ............. | H04J 3/0664 370/503 |
| 7,558,326 B1 * | 7/2009 | Lyle | ........................ | H04L 1/0057 348/469 |
| 7,627,228 B2 | 12/2009 | Jitsuhara | | |
| 7,966,510 B2 | 6/2011 | Harrison et al. | | |
| 8,341,454 B1 | 12/2012 | Kondapalli | | |
| 9,131,274 B2 * | 9/2015 | Kim | ................ | H04N 21/23608 |
| 2001/0055354 A1 * | 12/2001 | Fung | ....................... | G06Q 40/02 375/354 |
| 2003/0014763 A1 * | 1/2003 | Chappell | ................ | H04H 20/78 725/111 |
| 2003/0231607 A1 * | 12/2003 | Scanlon et al. | ................ | 370/338 |
| 2003/0231655 A1 * | 12/2003 | Kelton et al. | ................ | 370/468 |
| 2005/0105498 A1 * | 5/2005 | Hardacker et al. | ............ | 370/338 |

(Continued)

*Primary Examiner* — Thomas Lee
*Assistant Examiner* — Volvick Derose (57) ABSTRACT

An apparatus and method for synchronizing a multimedia interface clock between a multimedia source device and a multimedia sink device connected over a wireless channel. The method comprises measuring a frequency of the source clock signal generated by the multimedia source device, wherein the measurement of the frequency is performed using a first reference clock signal; generating a frequency-stamp message including in part the measured frequency; encapsulating the frequency-stamp message in at least one packet; and transmitting the at least one packet to a wireless receiver connected to the multimedia sink device over the wireless channel.

21 Claims, 5 Drawing Sheets

(56) References Cited

U.S. PATENT DOCUMENTS

| | | | |
|---|---|---|---|
| 2005/0138455 A1* | 6/2005 | Loukianov et al. | 713/400 |
| 2006/0056460 A1* | 3/2006 | Currivan | H04J 3/0682 370/503 |
| 2006/0109849 A1* | 5/2006 | Uchimoto | H04L 12/5601 370/395.1 |
| 2006/0161675 A1* | 7/2006 | Ducharme | H04N 21/23406 709/231 |
| 2010/0086093 A1* | 4/2010 | Sheet | H04L 3/0661 375/376 |
| 2010/0172368 A1 | 7/2010 | Eng | |
| 2010/0272102 A1 | 10/2010 | Kobayashi | |
| 2010/0309934 A1* | 12/2010 | Umayabashi | H03L 7/06 370/509 |
| 2011/0110358 A1* | 5/2011 | Haartsen et al. | 370/350 |
| 2012/0257680 A1* | 10/2012 | Dickens | H04N 5/775 375/240.25 |

\* cited by examiner

TECHNIQUES FOR SYNCHRONIZING A CLOCK OF A WIRED CONNECTION WHEN TRANSMITTED OVER A WIRELESS CHANNEL

CROSS REFERENCE TO RELATED APPLICATIONS

The application claims the benefit of U.S. provisional application No. 61/591,032 filed Jan. 26, 2012, the contents of which are herein incorporated by reference.

TECHNICAL FIELD

The invention relates generally to techniques for synchronizing clocks of digital multimedia interfaces transmitted over a wireless channel.

BACKGROUND

High speed serial multimedia interfaces including, for example, a high-definition multimedia interface (HDMI™) and a DisplayPort™, are interfaces that are used for transmitting uncompressed digital streams. Such interfaces connect digital multimedia source devices (e.g., a set-top box, a DVD player, a computer, a video game console, etc.) to a compatible multimedia sink device, e.g., a high definition television. Other multimedia interface standards that define the digital display interfaces of digital audio/video interconnections for handled devices have been recently defined. Examples for such multimedia interface standards include the mobile high-definition link (MHL) and Mobility DisplayPort™ (or MyDP).

Generally, the multimedia interface standards have been designed to transfer high-definition multimedia (video/audio) and control signals from a source device to a sink device over a physical medium cable. The signals are transferred at a high baud which is synchronized by a high frequency clock signal.

For example, in a HDMI system, a multimedia source device is connected to a multimedia sink device through a HDMI cable. A multimedia source transmits high speed data using transmission minimized differential signaling (TMDS®) characters. The TMDS characters encapsulate video, audio, and auxiliary data, and are carried over three TMDS channels. A multimedia sink device receives the TMDS characters and converts them into digital video streams and control codes that are encoded in the auxiliary data. The control codes include ESS, HSYNC and VSYNC signals. In addition, configuration, system-level control, management, and status information is exchanged between the multimedia source sink devices. The system-level control signals, such as display data channel (DDC) and consumer electronics control (CEO), are also exchanged between the source and sink devices.

A clock, typically running at a video pixel rate, is transmitted from the source device on a clock channel and is used by the sink device as a frequency reference for data recovery of TMDS characters. The TMDS characters are transferred, over the TMDS channels, at a rate synchronized with the video pixel rate transported over the clock channel. A frequency (i.e., a video pixel rate) of the clock signal determines the number of pixels transmitted per second and is determined by the HDMI standard. For example, the frequency of a clock signal is from 250 Mb/Sec up to 3.4 Gb/Sec.

A distributed peripheral interconnect bus connects a root component to endpoint components that are located remotely from each other. For example, such a bus allows the connectivity, between root and endpoint components over a wireless medium or a wireless channel.

Figure 1:
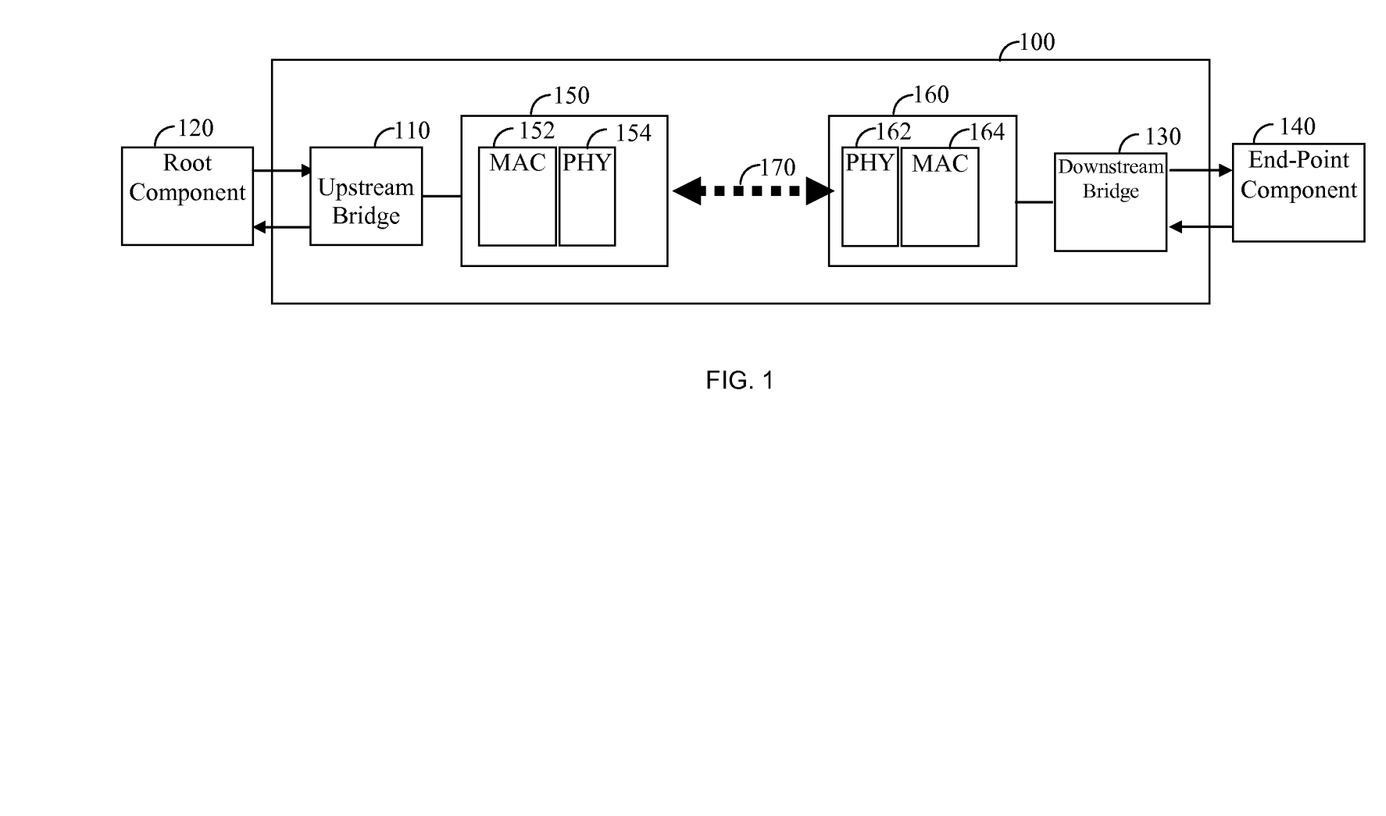
FIG. 1 is a block diagram of a distributed interconnect bus apparatus.

An exemplary diagram of a distributed interconnect bus apparatus 100 is shown in FIG. 1. The apparatus 100 comprises an upstream bridge 110 connected to a root component 120 and a downstream bridge 130 connected to an endpoint component 140. The root component 120 is typically a host bridge of a computing device while the endpoint component 140 provides a connectivity to a peripheral device, such as a monitor.

The bridges 110 and 130 communicate over a link 170 which is the medium used to transfer the data between the components 120 and 140. The medium may be, but is not limited to, air, a copper cable, a fiber optic, and so on. That is, the interconnect bus apparatus 100 forms a distributed bus for transferring data between remote devices coupled to the root component 120 and the endpoint component 140. The transport protocol used to carry data between the components 120 and 140 may be, but is not limited to, IEEE 802.11ad (Wi-Gig), IEEE 802.11x (Wi-Fi), Ethernet, Infiniband, and the like. Each of the bridges 110 and 130 includes or is connected to a physical (PHY) layer module (154, 162) and a MAC layer module (152, 164) compliant with the transport protocol.

The apparatus 100 also enables distributed connectivity of high speed serial multimedia interfaces, such as those mentioned above. In such a configuration, the root component 120 is connected to a multimedia source device and the endpoint component 140 is connected a multimedia sink device. Therefore, to enable proper connectivity over the distributed medium, e.g., a wireless channel, the multimedia signals streamed to the multimedia sink device should be synchronized with the clock signal of the respective multimedia interface (hereinafter a "multimedia interface clock signal"). For example, the TMDS characters should be transferred together with a multimedia interface clock signal, to enable a distributed HDMI connectivity.

As noted above, the multimedia interface clock signal generated by the multimedia source is used by the multimedia sink to recover the data. In the arrangement shown in FIG. 1, the multimedia interface clock signal is not transferred over a wire connecting the root and endpoint components 120 and 140. Thus, there is a need to transfer and synchronize the multimedia interface clock signal between the upstream and downstream bridges 110 and 130. It should be noted that the multimedia interface clock signal has a frequency that is different than the frequency of the radio signals utilized for the wireless transmission.

Current attempts to synchronize the transfer of a multimedia interface clock signal over a distributed medium include sending timestamp messages from a wireless transmitter 150 to a wireless receiver 160. The timestamp messages can be then used by a phase-locked loop (PLL) circuitry, in the downstream bridge 130, to lock on the multimedia interface clock signal generated by the multimedia source (root component 120). The timestamp is measured and the timestamp message is derived by the downstream bridge 110. However, such a solution would be feasible only if the jitter of the timestamp messages is very low, e.g., less than 10 microseconds. This requirement cannot be met when, for example, retransmitting packets that include the original timestamp messages.

Figure 2:
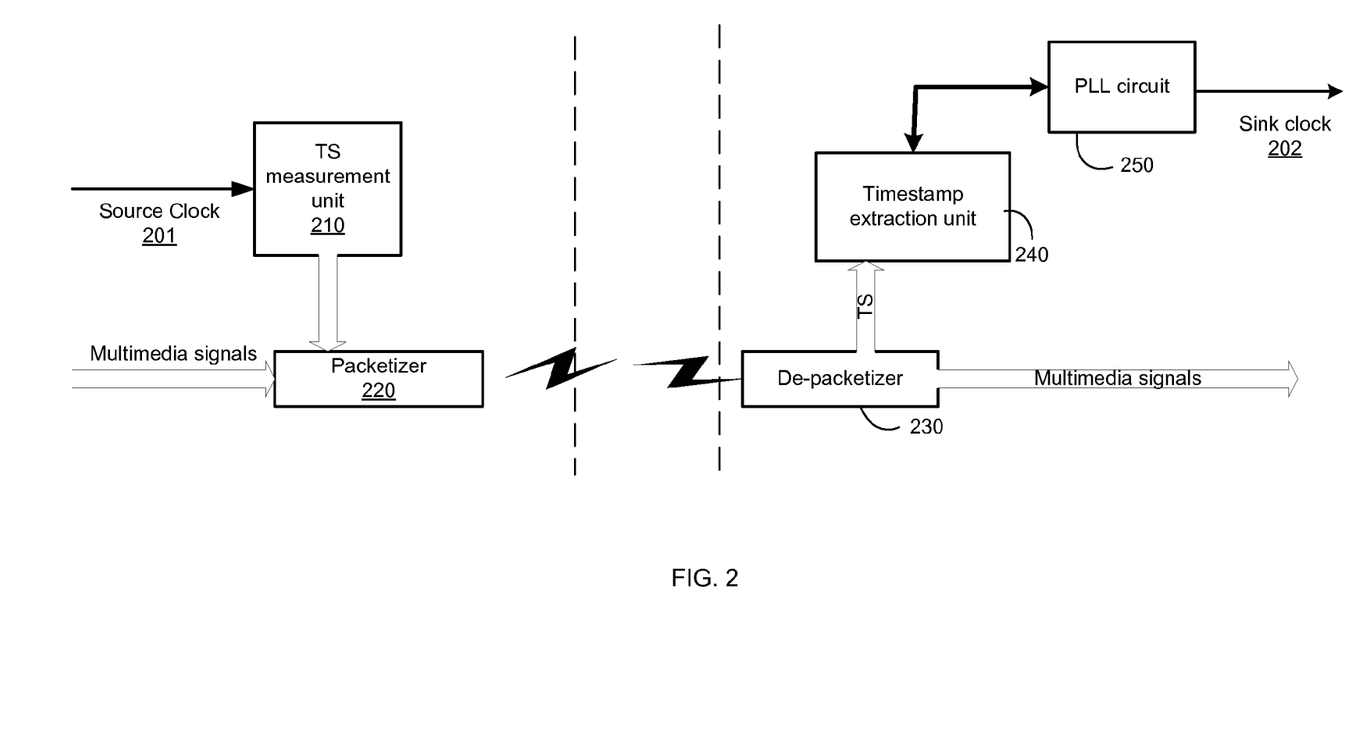
FIG. 2 is a diagram illustrating a current technique for synchronizing a clock signal of a multimedia interface.

A conventional process for synchronizing the multimedia interface clock signal using timestamps is further described with a reference to FIG. 2. A source clock (201) generated by a source device is input into a timestamp (TS) measurement unit 210 that records the clock cycles that passed since the last generated timestamp. The unit 210 outputs a timestamp message indicating the counted clock cycles. The timestamp messages are later encapsulated in data packets together with multimedia and control signals (e.g., TMDS characters) by a packetizer 220. This process is typically performed by a wireless transmitter.

The packets are transmitted over a wireless medium to a wireless receiver where the data packets are de-packetized by a de-packetizer 230 and the timestamp message is extracted by a timestamp (TS) extraction unit 240. Then, the timestamp value is transferred to the PLL circuit 250 that generates a clock signal (202) for the sink device having a frequency in proximity to a frequency of a clock signal generated by the multimedia source device.

Typically, a PLL circuit generates an output signal having a phase that is related to the phase of an input "reference" signal, i.e., the source clock as represented by the timestamp messages. Frequency is the derivative of the phase, thus when the source and sink clock signals' phases are in a lock state, their frequencies are also locked, i.e., synchronized. However, as mentioned above, this solution is not tolerant to jitter, thus it is inefficient for distributed connectivity and particularly a wireless medium.

Therefore, it would be advantageous to provide a high performance interconnect bus that would allow a distributed multimedia interface connectivity. It would be further advantageous if a solution was presented for synchronizing clocks of wired connections when transmitted over a wireless channel.

SUMMARY

Certain embodiments disclosed herein include a method for synchronizing a multimedia interface clock between a multimedia source device and a multimedia sink device connected over a wireless channel. The method comprises measuring a frequency of the source clock signal generated by the multimedia source device, wherein the measurement of the frequency is performed using a first reference clock signal; generating a frequency-stamp message including in part the measured frequency; encapsulating the frequency-stamp message in at least one packet; and transmitting the at least one packet to a wireless receiver connected to the multimedia sink device over the wireless channel.

Certain embodiments disclosed herein also include an apparatus for synchronizing a multimedia interface clock between a multimedia source device and a multimedia sink device connected over a wireless channel. The apparatus comprises a frequency measurement module for measuring a frequency of a source clock signal generated by the multimedia source device, wherein the measurement of the frequency is performed using a first reference clock signal, wherein the frequency measurement module is further configured to generate a frequency-stamp message including in part the measured frequency; a packetizer for encapsulating the frequency-stamp message in at least one packet; and a wireless transmitter for transmitting the at least one packet to a wireless receiver connected to the multimedia sink device over the wireless channel, wherein the measured frequency is recovered using a second reference clock, the measured frequency and the second reference clock are utilized to synthetize a sink clock signal for the multimedia sink device.

Certain embodiments disclosed herein also include an apparatus for synchronizing a multimedia interface clock between a multimedia source device and a multimedia sink device connected over a wireless channel. The apparatus comprises a de-packetizer for extracting a frequency-stamp from at least one packet received from a wireless transmitted connected to the multimedia source; a frequency setting unit for determining a frequency value based on the frequency-stamp, wherein the frequency value is respective of a frequency of a source clock signal and is measured using a first reference clock signal, the source clock signal is generated by the multimedia source device; and a clock generation unit for synthetizing a sink clock signal for the multimedia source device using the determined frequency value and a second reference clock signal.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In view of the shortcomings discussed above, certain embodiments disclosed herein allow efficient synchronization of a multimedia interface clock signal generated by a multimedia source device and a multimedia sink device over a distributed medium. Specifically, the embodiments disclosed herein enable the synchronization of multimedia interface clock signals regardless of the jitter induced by a transmitter of the source clock. According to one embodiment, the distributed medium is a wireless channel in which signals are transmitted over the 60 GHz frequency band.

Figure 3:
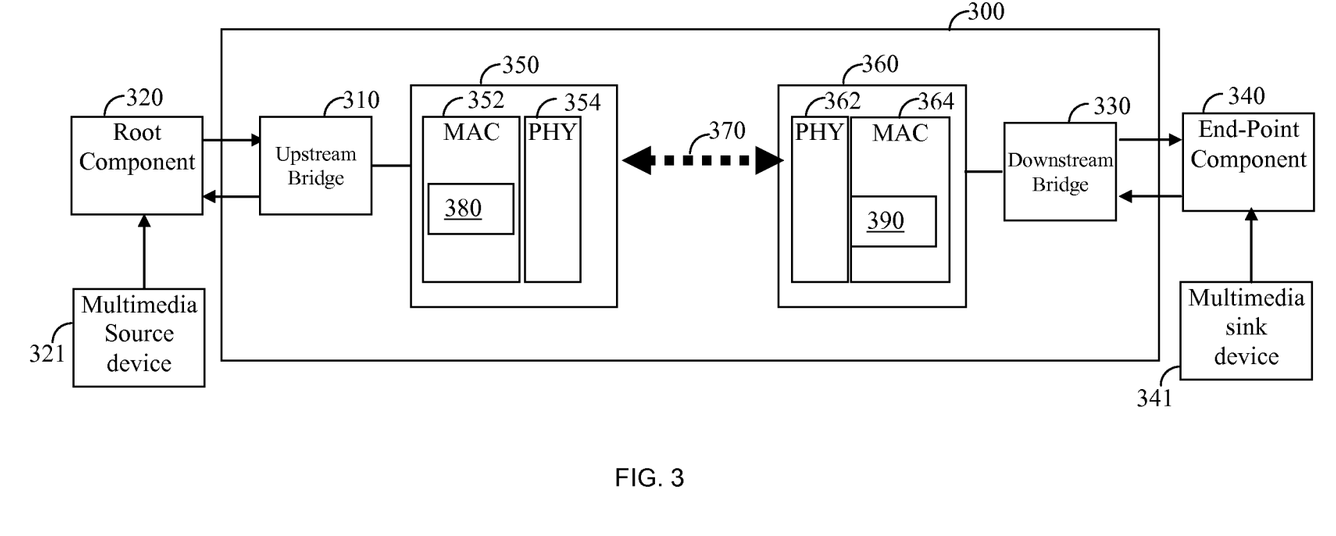
FIG. 3 is a block diagram of a distributed interconnect bus apparatus utilized to describe the various disclosed embodiments.

FIG. 3 shows an exemplary and non-limiting block diagram of a distributed interconnect bus apparatus 300 utilized to describe the various embodiments of the invention. The apparatus 300 comprises an upstream bridge 310 connected to a root component 320 and a downstream bridge 330 connected to an endpoint component 340. The root component 320 is typically a host bridge of a computing device while the endpoint component 340 provides a connectivity to a peripheral device.

According to the disclosed embodiments, the root component 320 is connected to a multimedia source device 321 (not shown) and the endpoint component 340 is connected to a multimedia sink device 341 (not shown). The multimedia source and sink devices 321 and 341 are compliant with a multimedia interface including, but not limited to, an HDMI, a DisplayPort, a MHL, a MyDP, and the like. In other embodiment, the source device 341 and sink device 321 may be compliant with a universal serial bus (USB), compatible with USB 1.x, 2.0, and 3.0 devices. In yet another embodiment, the multimedia source and sink devices 321 and 341 may be Peripheral Component Interconnect Express (PCIe) endpoints. Regardless of the type of the source and sink devices 341 and 321, the upstream and downstream bridges 310 and 330 form, in one embodiment, a distributed Peripheral Component Interconnect Express (PCIe) bus apparatus. An example for such a bus apparatus can be found in a copending U.S. patent application Ser. No. 12/021,290 assigned to the common assignee and hereby incorporated by reference for all that it contains.

The bridges 310 and 330 communicate over a wireless channel 370 which provides the medium used to transfer the data between the components 320 and 340. According to one embodiment, the transport protocol used to carry data between the components 320 and 340 may be, but is not limited to, WiGig as published as an EEE 802.11ad standard, and the like. Each of the upstream and downstream bridges 310 and 330 is respectively connected to a wireless transmitter 350 and a wireless receiver 360. According to an embodiment, the wireless transmitter 350 and receiver 360 transmit and receive signals in the 60 GHz frequency band using the transport protocol utilized by the bus apparatus 300. Each of the wireless transmitter 350 and receiver 360 includes a physical (PHY) layer module (354, 362) and a MAC layer module (352, 364) compliant with the respective transport protocol.

According to certain embodiments disclosed herein, in order to allow proper connection between the multimedia source device 321 and multimedia sink device 341 over the wireless channel 370, the MAC module 352 includes a clock encapsulator module 380 and the MAC module 364 includes a clock de-encapsulator module 390. The modules 380 and 390 allow proper synchronization of a multimedia interface clock between the source and sink devices 321 and 341 over the wireless channel 370. As noted above, in order to enable proper connectivity over the wireless channel 370, the multimedia signals streamed to the multimedia sink should be synchronized with the multimedia interface clock signal. For example, the TMDS characters should be transferred together with an HDMI clock signal, to enable encoding of the TMDS characters by the multimedia sink 341.

According to one embodiment, the clock encapsulator module 380 measures a frequency of a multimedia interface clock signal generated by the multimedia source 321. The frequency of the clock is measured using a crystal (not shown in FIG. 3) included in the wireless transmitter 360. Thereafter, a frequency-stamp message is created to include the measured frequency. Frequency-stamp messages are encapsulated in packets together with multimedia signals received from the multimedia source 321. The packets are transmitted to the wireless receiver 360 over a wireless channel 370.

The clock de-encapsulator module 390, de-packetizes the received packets to separate the multimedia signals and the frequency-stamp messages included therein. The module 390 then extracts the measured frequency value from each frequency-stamp message. Using the measured frequency value and a reference clock signal provided by a crystal (not shown in FIG. 3) a sink clock signal of a multimedia sink device 341 is generated. The generated sink clock signal is synchronized with the source clock signal up to an offset value of the one reference clock signal from the other.

Figure 4:
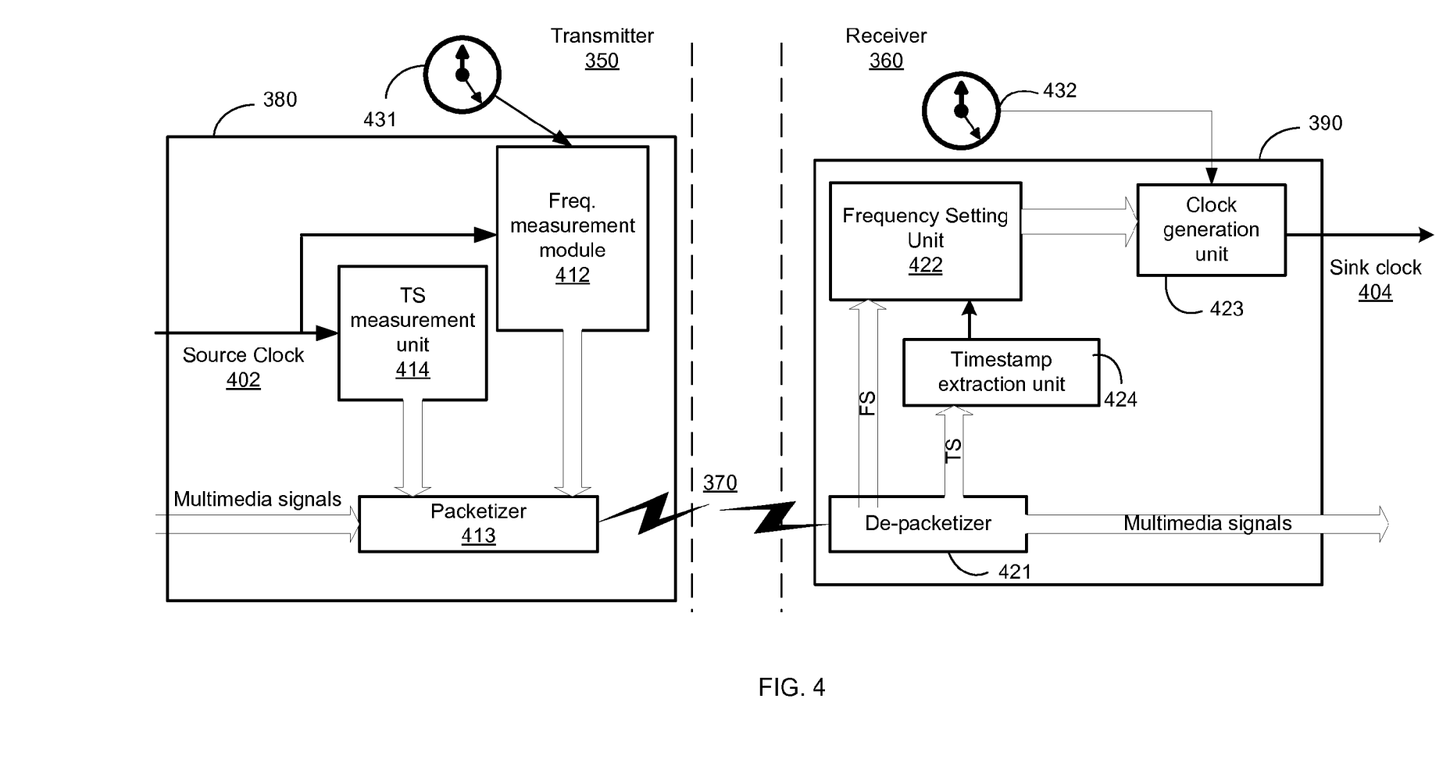
FIG. 4 is a diagram illustrating clock encapsulator and de-encapsulator modules utilized to synchronize a multimedia interface clock signal implemented according to one embodiment.

FIG. 4 shows an exemplary and non-limiting block diagram of the clock encapsulator and de-encapsulator modules 380 and 390 implemented according to one embodiment. The crystals 431 and 432 are included in each of the wireless transmitter 350 and receiver 360 and are utilized as reference clock signals. Each of the crystals 431 and 432 can be any oscillating device that generates an oscillating clock signal. The crystals 431 and 432 generate reference clock signals that are synchronized with each other, up to 20 parts per million (PPM).

The encapsulator module 380 includes a frequency measurement module 412 and a packetizer 413. The frequency measurement module 412 measures a frequency of a source clock signal (402) of a multimedia source device. Various techniques can be utilized for measuring the frequency of the source clock signal 402 by the frequency measurement module 412. In one embodiment, the clock signal generated by the crystal 431 (or any other reference oscillating signal) determines the sampling rate. During a predefined number of clock cycles of the reference clock signal generated by the crystal 431, cycles of the source clock signal 402 are counted. Then, the cycles' count multiplied by the frequency of the reference clock signal is divided by the predefined number of clock cycles of the reference clock signal. That is:

$$F_{SOURCE\text{-}CLK} = F_{REF\text{-}CLK} * N/X,$$

wherein, $F_{SOURCE\text{-}CLK}$ is the frequency of the reference clock, $F_{REF\text{-}CLK}$ is the frequency of the reference clock signal of the crystal 431, N is the cycles' count, and X is the predefined number of clock cycles. As the reference clock signal is very accurate, so does the measured frequency.

In another embodiment, the frequency measurement may be performed by a circuit that is timed by the signal generated by the crystal 431. In yet another embodiment, the measurement is performed by sampling a status of a synchronization-buffer between two clock domain crossing. One of the domains is source clock and the other clock domain is the crystal clock signal.

Once the frequency of the source clock signal is measured, the frequency measurement unit 412 encapsulates this measurement in a frequency-stamp message. In one embodiment, the frequency stamp message includes the measured frequency message up to the required accuracy of respective multimedia standard, which the sink device can decode. The frequency stamp message can be defined with or without a prior knowledge of the crystal reference clock in the sink device 341.

A packetizer 413 generates packets according to the wireless protocol employed by the system, for example, the WiGi protocol also published as the IEEE 802.11ad standard. The packetizer 413 encapsulates the frequency-stamp messages and multimedia/control signals provided by the multimedia source device 321 (not shown) into packets. The multimedia and control signals may be compliant with multimedia interface standards, for example, an HDMI, a DisplayPort, MHL, MyDP, and the like.

The packets are wirelessly transmitted over the wireless channel 370 to the wireless receiver 360, connected to the multimedia sink device 341 (not shown). The de-encapsulator module 390 includes a de-packetizer 421 that separates the multimedia/control signals and the frequency time-stamps from the received packets. The de-packetizer 421 extracts the frequency-stamp messages and multimedia signals from the received packets. The module 390 also includes a frequency setting unit 422 that translates the frequency-stamp in the message to a frequency value that can be utilized in a clock generation unit 423. In one embodiment, the frequency value is a multiplication value indicating the difference the frequency of the source clock and a reference clock signal generated by the crystal 432, based on the frequency-stamp.

The clock generation unit 423, using the frequency value provided by the frequency setting unit 422 and a reference clock signal from the crystal 432, synthesizes a sink clock signal 404. The generated sink clock signal 404 can be utilized by the multimedia sink device 341 (not shown) to properly synchronize to the multimedia/control signals sent from the multimedia sink device 321 (not shown). It should be noted that the frequency-stamp is determined based on the reference clock signal of the crystal 431, the sink source clock is synthesized using the reference clock signal of the crystal 432, and the crystals 431 and 432 are synchronized with each other, up to 20 PPM, thus there can be a deviation of up to 20 PPM between the frequencies of the source clock signal (402) and sink clock signal (404). One of ordinary skill should appreciate that a 20 PPM difference between the clocks is tolerable by the multimedia interface standards.

The clock generation unit 423, in one embodiment, is implemented as a PLL circuit. Accordingly, the PLL circuit generates a sink clock signal 404 having frequency that is a multiplication of the reference clock signal provided by the crystal 432 multiplied by the frequency value provided by the frequency setting unit 422.

In another embodiment, the frequency value provided by the frequency setting unit 422 can be used to start the PLL circuit very close to the PLL circuit convergence limit, thus significantly alleviating hardware requirements of the PLL circuit and also reducing the frequency in which time-stamp messages are sent from the wireless transmitter 350.

According to another embodiment, the clock generation unit 423 is implemented as a frequency synthesizer. The synthesizer uses the reference clock signal provided by the crystal 432 and the frequency value fed by the unit 422 to synthesis the sink clock signal 404.

As illustrated in FIG. 4, the module 380 may also generate timestamp messages respective of the source clock signal. This is performed by the timestamp measurement unit 414 discussed above. At the clock de-encapsulator module 390, the timestamp values included in the received messages are determined by a timestamp extraction unit 424. In accordance with one embodiment, the timestamp values are utilized as supplemental information of the frequency-stamps when synthesizing the sink clock signal. Accordingly, this can be performed using a frequency stamp for fast and accurate initial frequency locking, then utilizing the time-stamp for a stable tracking phase of the clock generation unit 423 (implemented as a PLL circuit). Furthermore, the time-stamp in combination of the frequency stamp can be used for a phase synchronization, which is not provided when only using frequency-stamps. Phase synchronization can be important to some devices operating at low frequencies, such as an audio device.

Figure 5:
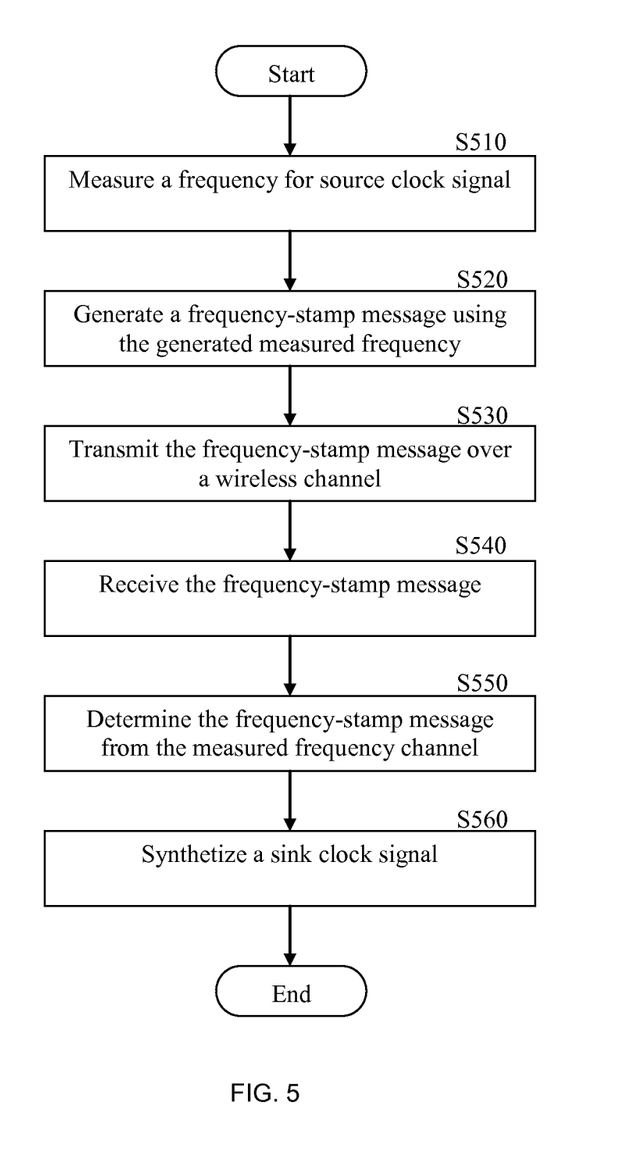
FIG. 5 is a flowchart a multimedia interface clock signal implemented according to one embodiment.

FIG. 5 is a non-limiting and exemplary flowchart 500 illustrating a method for synchronizing a multimedia interface clock between multimedia source and sink devices that are connected over a wireless channel according to one embodiment. At S510, a frequency of a clock signal generated by the multimedia source is measured. The multimedia source is compliant with at least HDMI, and DisplayPort, MHL, MyDP, and the like. In another embodiment, the multimedia source device may a USB 1.x, 2.0, and 3.0 device or a PCIe endpoint As noted above, the measurement is performed, in part, using a reference clock signal generated by a crystal in a wireless transmitter. At S520, a frequency-stamp message including the measured frequency is generated. At S530, the frequency-stamp message is transmitted to a wireless receiver over a wireless channel. As noted above, the transmitted frequency-stamp messages can be encapsulated in packets together with multimedia and control signals generated by a multimedia source device.

At S540, the frequency-stamp message is received at the wireless receiver. At S550, the measured frequency value is extracted from the received frequency-stamp message. At S560, a clock signal to be utilized by the multimedia sink device is synthetized. In one embodiment, this is performed using a reference clock signal generated by the crystal (or any type of oscillator configured to generate an oscillating signal) and the measured frequency is included in the received frequency-stamp message. The various techniques to synthetize the clock sink signals are discussed above. The multimedia sink device is compliant with at least HDMI, and DisplayPort, MHL, MyDP, and the like. In another embodiment, the multimedia sink device may a USB 1.x, 2.0, and 3.0 device or a PCIe endpoint. In an embodiment, the frequencies of the source clock signal and sink clock signal are synchronized up to 20 PPM.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:
1. A method, performed by a device, for wireless communication, comprising:
  measuring a frequency of a source clock signal generated by the device, wherein the measurement of the frequency is performed using a first reference clock signal;
  generating a frequency-stamp message based on the measured frequency, wherein the frequency-stamp message indicates the frequency of the source clock as a function of a frequency of the first reference clock signal;

encapsulating the frequency-stamp message in at least one packet; and transmitting the at least one packet to another device over a wireless channel.

2. The method of claim 1, further comprising:

encapsulating multimedia and control signals generated by the device in the at least one packet.

3. The method of claim 1, wherein measuring the frequency of the source clock signal further comprises:

counting clock cycles of the source clock signal during a number of clock cycles of the first reference clock signal;

multiplying the cycles' count by the frequency of the first reference clock signal; and dividing the result by the number of clock cycles.

4. The method of claim 1, wherein the device and the other device are compatible with a multimedia interface including any one of: a high-definition multimedia interface (HDMI), a DisplayPort interface, a mobile high-definition link (MHL) interface, and Mobility DisplayPort interface.

5. The method of claim 1, wherein any of the device and the other device is any one of: a universal serial bus (USB) device and a peripheral component interconnect express (PCIe).

6. The method of claim 1, wherein the at least one packet is transmitted over the wireless channel using a transport protocol, wherein the transport protocol is at least an IEEE 802.11ad protocol.

7. An apparatus for wireless communication, comprising:

a frequency measurement module configured to measure a frequency of a source clock signal generated by the apparatus, wherein the measurement of the frequency is performed using a first reference clock signal, wherein the frequency measurement module is further configured to generate a frequency-stamp message including at least in part the measured frequency;

a packetizer configured to encapsulate the frequency-stamp message in at least one packet, wherein the frequency-stamp message indicates the frequency of the source clock as a function of a frequency of the first reference clock signal; and a wireless transmitter configured to transmit the at least one packet to another device over a wireless channel.

8. An apparatus for wireless communication, comprising:

a de-packetizer configured to extract a frequency-stamp and a time-stamp from at least one packet received from a device;

a frequency setting unit configured to determine a frequency value based on the frequency-stamp; and a clock generation unit comprising a phase-locked loop (PLL), wherein the clock generation unit is configured to:

synthetize a sink clock signal using the determined frequency value and a reference clock signal during a locking phase of the PLL; and synthetize the sink clock signal using the time-stamp during a tracking phase of the PLL.

9. The apparatus of claim 8, wherein the frequency value is associated with a frequency of a source clock signal and was measured by the device using another reference clock signal, and wherein the reference clock signal and the other reference clock signal are deviated from each other by up to 20 parts per million (PPM).

10. The apparatus of claim 8, wherein the frequency value is associated with a frequency of a source clock signal and was measured by the device using another reference clock signal, wherein the source clock signal was generated by the device.

11. The apparatus of claim 8, wherein synthetizing the sink clock signal further comprises synthetizing a clock signal having a frequency that is a multiplication of a frequency of the reference clock signal multiplied by the determined frequency.

12. The apparatus of claim 8, wherein the clock generation unit comprises a phase-locked loop (PLL) circuit or a frequency synthesizer.

13. A method, performed by a device, for wireless communication, comprising:

receiving at least one packet from another device;

extracting a frequency-stamp and a time-stamp generated by the other device from at least one packet received from the other device;

determining a frequency value based on the frequency-stamp;

synthetizing a sink clock signal using the determined frequency value and a reference clock signal during a locking phase of a phase-locked loop (PLL); and synthetizing the sink clock signal using the time-stamp during a tracking phase of the PLL.

14. The method of claim 13, wherein the frequency value is associated with a frequency of a source clock signal and was measured by the other device using another reference clock signal, and wherein the reference clock signal and the other reference clock signal are deviated from each other by up to 20 parts per million (PPM).

15. The method of claim 13, wherein the frequency value is associated with a frequency of a source clock signal and was measured by the other device using another reference clock signal, wherein the source clock signal was generated by the other device.

16. The method of claim 13, wherein synthetizing the sink clock signal further comprises synthetizing a clock signal having a frequency that is a multiplication of a frequency of the reference clock signal multiplied by the determined frequency.

17. The method of claim 13, wherein synthetizing the sink clock signal is performed by the phase-locked loop (PLL) circuit or a synthesizer.

18. A computer-readable medium for wireless communication having instructions stored thereon for:

measuring a frequency of a source clock signal generated by a device, wherein the measurement of the frequency is performed using a first reference clock signal;

generating a frequency-stamp message based on the measured frequency, wherein the frequency-stamp message indicates the frequency of the source clock as a function of a frequency of the first reference signal;

encapsulating the frequency-stamp message in at least one packet; and transmitting the at least one packet to another device over a wireless channel.

19. A computer-readable medium for wireless communication having instructions stored thereon for:

receiving at least one packet from a device;

extracting a frequency-stamp and a time-stamp generated by the device from at least one packet received from the device;

determining a frequency value based on the frequency-stamp;

synthetizing a sink clock signal using the determined frequency value and a reference clock signal during a locking phase of a phase-locked loop (PLL); and synthetizing the sink clock signal using the time-stamp during a tracking phase of the PLL.

20. The apparatus of claim 14, wherein the packetizer encapsulates multimedia and control signals generated by the apparatus in the at least one packet.

21. The apparatus of claim 14, wherein the module for measuring the frequency of the source clock signal further comprises modules for:
   counting clock cycles of the source clock signal during a number of clock cycles of the first reference clock signal;
   multiplying the cycles' count by the frequency of the other reference clock; and
   dividing the result by the number of clock cycles.

* * * * *